Figure 1:
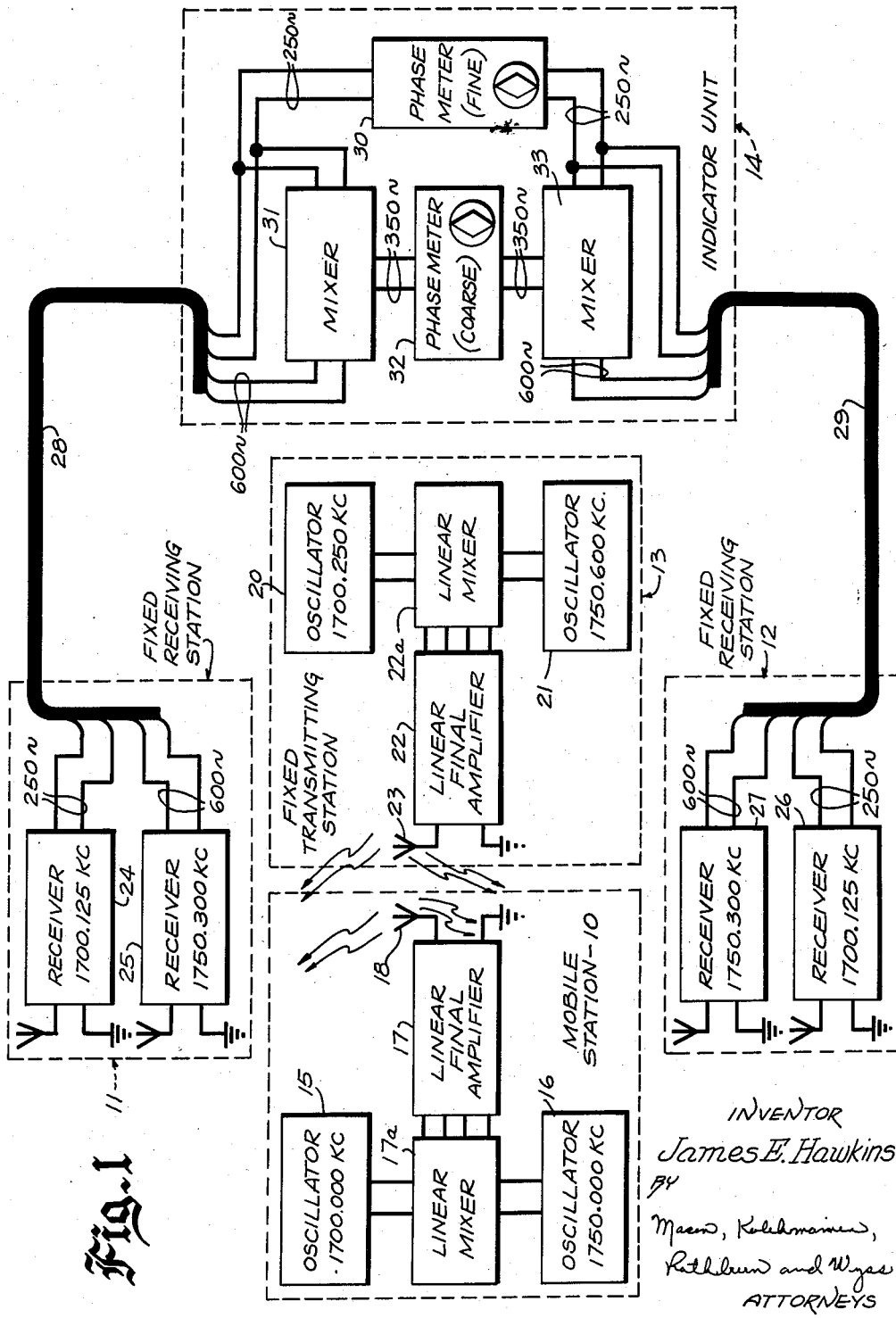

Oct. 14, 1958

J. E. HAWKINS 2,856,601

RADIO LOCATION SYSTEM

Filed July 6, 1955

3 Sheets-Sheet 1

INVENTOR
James E. Hawkins
BY
Mason, Kolehmainen,
Rathburn and Wyss
ATTORNEYS

Oct. 14, 1958     J. E. HAWKINS     2,856,601
RADIO LOCATION SYSTEM
Filed July 6, 1955     3 Sheets-Sheet 2

INVENTOR
James E. Hawkins
BY
Mason, Kolehmainen,
Rathburn and Wyss
ATTORNEYS

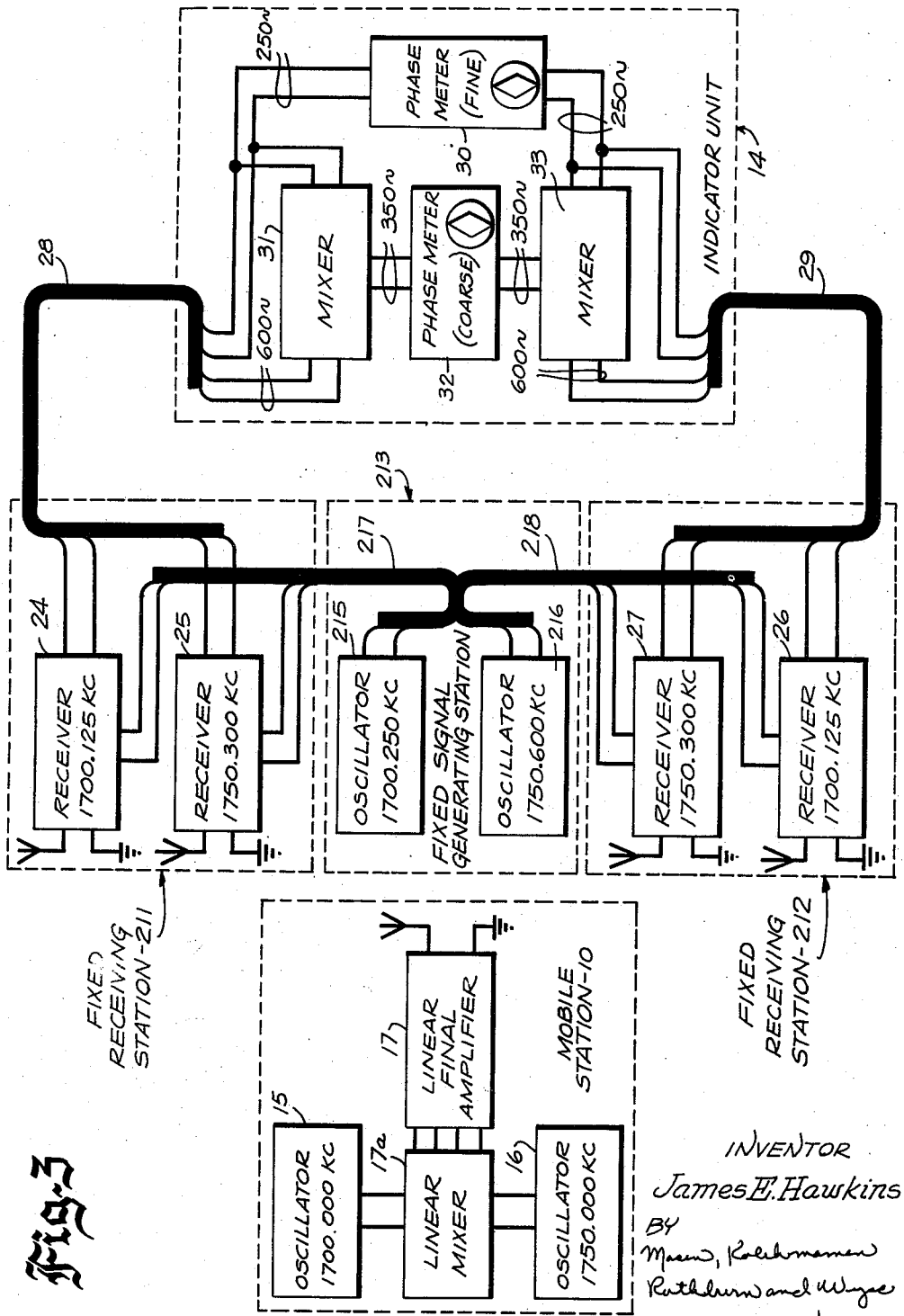

United States Patent Office 2,856,601
Patented Oct. 14, 1958

2,856,601

RADIO LOCATION SYSTEM

James E. Hawkins, Tulsa, Okla., assignor to Seismograph Service Corporation, Tulsa, Okla., a corporation of Delaware Application July 6, 1955, Serial No. 520,274

20 Claims. (Cl. 343—105)

The present invention relates to radio location systems and more particularly to improvements in radio position finding systems of the hyperbolic continuous wave type employing phase comparison in pairs of position indicating signals respectively radiated from a fixed point and from a mobile station in order to provide indications from which the position of the mobile transmitting station relative to the known positions of the receiving points may be determined.

In systems of the particular type referred to, the continuous waves radiated from the mobile transmitter and from the fixed transmitter when received at a pair of spaced fixedly positioned receiving stations bear a phase relationship which changes as a function of the changing position of the mobile transmitting station. More specifically, the radiated waves are characterized by isophase lines which are hyperbolic in contour and have foci at the spaced receiving stations. On a base line bisecting the pair of receiving stations, these isophase lines are spaced apart a distance equal to one-half the mean wave length of the radiated waves and have diverging spaces at point on either side of this base line. With this system arrangement, the position of the mobile transmitting point relative to a pair of hyperbolic isophase lines may be determined by measuring the phase relationship between continuous waves radiated from the mobile transmitting station and from the fixed station.

Since the point of location of the mobile transmitting point along the zone separating the two isophase lines is not indicated by such a phase measurement, it becomes necessary to employ at least three spaced receiving stations different pairs of which function to provide a grid like pattern of intersecting hyperbolic lines, in order to obtain absolute determination of the position of the mobile station. The position indications provided by systems of the character described above are exceedingly accurate.

One of the principal problems encountered in the operation of continuous wave systems of this type is that of eliminating ambiguity from the phase measurements which provide the desired position information. Thus, while the two phase measurements identify the position of the mobile station relative to two intersecting pairs of hyperbolic isophase lines, they do not indicate the particular pairs of lines to which the indications are related. This means that in operating such a system the geographic location of the mobile station must be known at the start of its movement and, furthermore, that the successive wave lengths must be counted as the mobile station is moved relative to the grid like pattern of hyperbolic lines. It also means that the position of a mobile craft entering the system cannot be determined without first ascertaining the approximate position of the craft relative to the spaced receiving stations. It would therefore be desirable to provide a radio position finding system of the character described above in which the latter difficulties are obviated.

It is therefore an object of the present invention to provide an improved radio location system of the character described above which is free of the above-mentioned disadvantages pertaining to ambiguity.

It is another object of the present invention to provide an improved radio location system of the type described above wherein certain of the position indications obtained have different sensitivities insofar as the spacing of the isophase lines is concerned, which will be referred to hereinafter as phase sensitivity.

It is a further object of the present invention to provide a radio position finding system of the character described above combining economy of construction with precise, non-ambiguous position determinations.

It is a still further object of the invention to provide a radio position finding system of the character described in which one or more low phase sensitivity position indications and one or more high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

It is likewise of the present invention to provide an improved transmission system for use in radio location systems of the above indicated character.

It is also an object of the invention to provide improved receiving equipment for use in radio location systems of the above indicated character.

Figure 2:
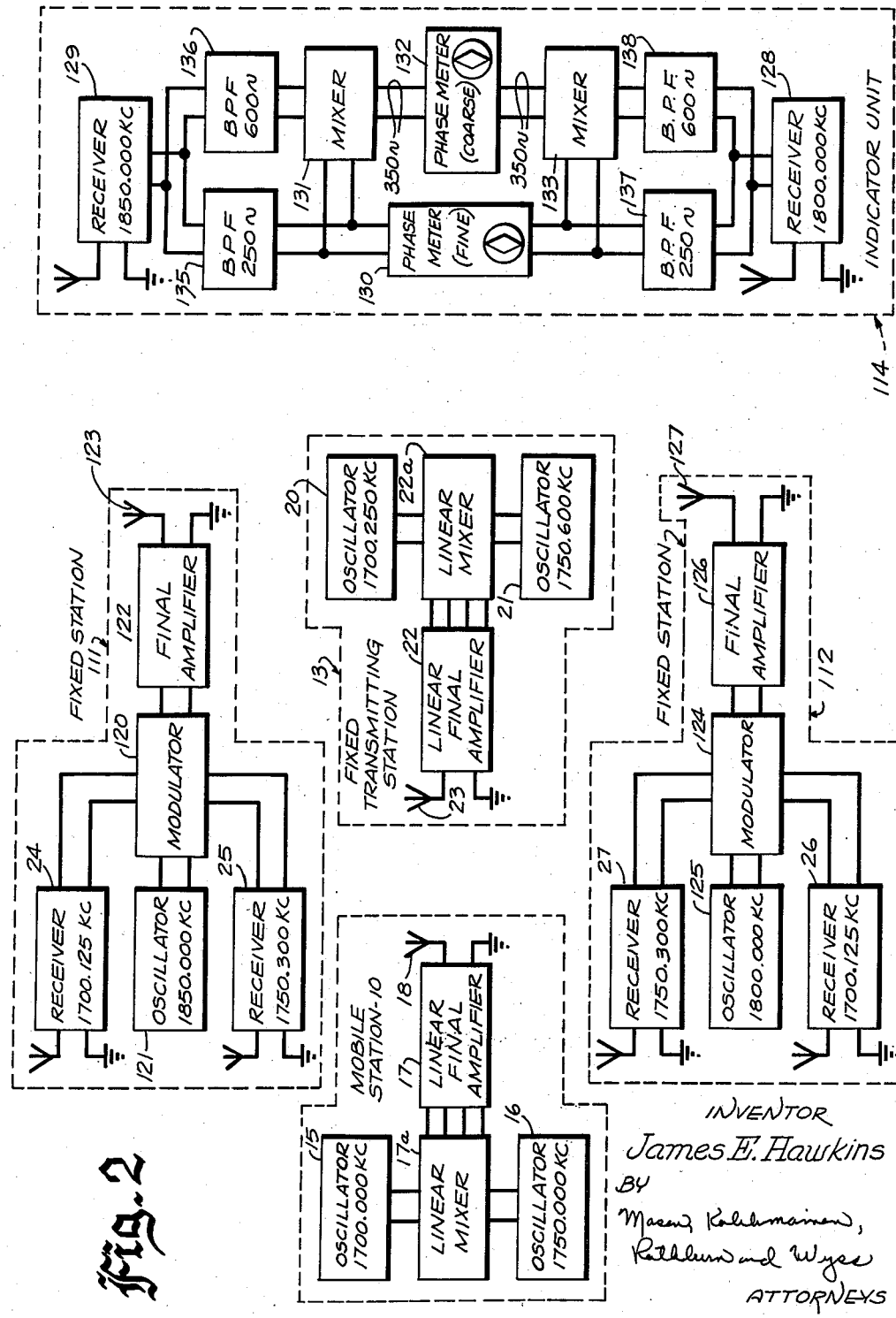

The invention, both as to its organization and method of operation, together with further objects and advantages thereof, will best be understood by reference to the specification taken in conjunction with the accompanying drawings in which;

Fig. 1 diagrammatically illustrates the component element constituting the transmitting and receiving units employed in a radio location system characterized by the features of the present invention;

Fig. 2 diagrammatically illustrates an alternative arrangement of the transmitting and receiving units employed in an alternative arrangement of the radio location system of the present invention; and Fig. 3 diagrammatically illustrates the component elements employed in still another arrangement of the transmitting and receiving units of a radio location system characterized by the features of the present invention.

Referring now to the drawings and more particularly to Fig. 1 thereof, the present invention is there illustrated as embodied in a two-foci, hyperbolic, continuous wave system for providing at a fixedly positioned indicating unit 14 position information concerning the location of a mobile transmitting station 10 with respect to a pair of spaced fixedly positioned receiving stations 11 and 12. The mobile station 10, which is provided with equipment for radiating a pair of radio frequency signals of fixed frequency, is adapted to be carried upon a mobile vehicle or vessel for movement to any position within the system so long as its radiated waves may be reliably received at the receiving stations 11 and 12.

To provide the above described position indications, the system further includes a stationary transmitting or signal generating station 13 which may be referred to as a reference transmitter. The reference transmitter 13 is adapted to emit a pair of signals which not only differ in frequency from each other but are respectively separated by a small audio frequency difference from the pair of signals radiated by the mobile station 10. Specifically, one of the signals radiated by the mobile station 10 and one of the signals radiated by the fixed transmitting station 13 are separated by only a few hundred cycles in frequency from each other and, hence, both of these waves may be received by a single receiver provided at each of the fixed receiving stations 11 and 12. The second wave radiated from the mobile station 10 and second wave radiated from the fixed transmitting station 13 are likewise separated by a small audio difference frequency with the result that these waves can also be received by suitable receiving equipment at the fixed stations 11 and 12. Moreover, to facilitate separation of the radiated signals, the two waves radiated from the mobile station 10 are separated from each other by several kilocycles in frequency and the same is true of the pair of waves radiated from the reference transmitter 13.

Specifically, the mobile station 10 comprises an oscillator 15 for generating signals having a frequency of 1700.000 kilocycles, an oscillator 16 for developing signals having a frequency of 1750.000 kilocycles and a linear signal transmission channel, comprising a linear mixer 17a and a linear final amplifier 17, for amplifying these signals without generating intermodulation components or other undesired responses in order to effect the simultaneous radiation of a pair of signals of the indicated frequencies from a radiating antenna 18. Linear signal transmission channels of this character are described and claimed in copending application of William R. Hunsicker, Serial No. 425,471, filed April 23, 1954, and assigned to the same assignee as the present invention.

Similarly, the fixed transmitting station 13 comprises an oscillator 20 for developing signals having a frequency of 1700.250 kilocycles, an oscillator 21 for developing signals having a frequency 1750.600 kilocycles and a linear signal transmission channel, comprising linear mixer 22a and a linear final amplifier 22, for amplifying the signals developed by both of the oscillators 20 and 21 without generating intermodulation components, thereby to effect continuous and simultaneous radiation of a pair of radio frequency signals from a radiating antenna 23.

The fixed receiving stations 11 and 12 comprise identical equipment and each includes a first receiver center tuned to a frequency of 1700.125 kilocycles for receiving the 1700.000 kilocycle wave radiated from the mobile station 10 together with the 1700.250 kilocycle wave radiated from the transmitting station 13 and a second receiver center tuned to a frequency of 1750.300 kilocycles for receiving the 1750.000 kilocycle wave from the mobile station 10 and 1750.600 kilocycle wave from the fixed transmitting station 13. The receivers at the fixed receiving station 11 are designated 24 and 25 while those at the fixed receiving station 12 are designated 26 and 27. Each of the receivers 24 and 26 heterodynes the two carrier waves which it accepts and produces a 250 cycle beat frequency signal while, at the same time, each of these receivers is sufficiently selective to reject both the 1750.000 kilocycle signal radiated from the mobile station 10 and the 1750.600 kilocycle signal radiated from the fixed transmitting station 13. The receivers 25 and 27, which are sufficiently selective to reject the 1700.000 and 1700.250 kilocycle signals respectively radiated from the mobile station 10 and from the reference transmitter 13, each heterodyne the two signals which they accept and produce the 600 cycle beat frequency therebetween. The two beat frequencies developed by the receivers 24 and 25 at the fixed receiving station 11 are applied through a suitable multi-conductor cable or transmission line 28 to the indicator unit 14 which is preferably spaced some distance from both the fixed receiving stations 11 and 12 and from the fixed transmitting station 13. Similarly, the two beat frequency signals developed by the receivers 26 and 27 at the fixed receiving station 12 are applied to the indicator unit 14 through a multi-conductor cable 29.

At the indicator unit 14, the 250 cycle signal developed by the receiver 24 is applied directly to one set of signal input terminals of a phase meter 30, the other set of signal input terminals of which is excited by the 250 cycle signal developed by the receiver 26. As will be understood by those skilled in this art, a measurement of the phase relationship between the two input signals supplied to the phase meter 30 provides an indication of the location of the mobile station 10 along a hyperbolic line having foci at the fixed receiving stations 11 and 12. As previously mentioned, the hyperbolic isophase lines effectively produced in space between the fixed receiving stations 11 and 12 are separated along an imaginary base line interconnecting these stations by a distance corresponding to one-half of the wave length of the mean frequency of the 1700.000 kilocycle signal radiated from the mobile station 10 and the 1700.250 kilocycle signal radiated from the fixed transmitting station 13. At the indicated frequencies the hyperbolic isophase lines are separated by a distance of approximately 289 feet and, hence, the indication appearing on the phase meter 30 may be considered as a fine or high phase sensitivity position indication.

To provide a coarse or low phase sensitivity position indication for the purpose of resolving the ambiguity of the fine position indications, the 250 cycle signal developed by the receiver 24 and the 600 cycle signal developed by the receiver 25 are heterodyned by a mixer 31 at the indicator unit 14, thereby to develop a 350 cycle difference frequency for application to one set of signal input terminals of a phase meter 32. To the same end, the 250 cycle signal developed by the receiver 26 and the 600 cycle signal developed by the receiver 27 are heterodyned by a mixer 33 in order to develop a signal for application to the other set of signal input terminals of the phase meter 32. The phase sensitivity of the 350 cycle signals is determined by the ratio between the mean frequency of the waves from which the 250 cycle beat frequency signals were produced and the mean frequency of the waves from which the 600 cycle beat frequency signals were produced. At the indicated frequencies the phase sensitivity of the 350 cycle signals corresponds to a signal having a frequency of approximately 50.175 kilocycles which may be termed a phantom frequency equal to the difference between the real mean frequencies. Thus, when the 350 cycle signal from the mixer 31 is phased compared with the 350 cycle signal from the mixer 33 a relatively small number of lanes or 360 degrees phase coincidences between the fixed receiving stations 11 and 12 will be obtained and the resulting isophase lines will be spaced apart along the line joining the units 11 and 12 by a distance equal to one-half wave length of a wave having a frequency of 50.175 kilocycles or a distance of approximately 10,750 feet. It will thus be observed that the phase meters 30 and 32 provide two position indications of different sensitivity indicative of the position of the mobile transmitting station 10 relative to the fixed receiving stations 11 and 12. The low phase sensitivity reading obtained from the phase meter 32 may thus be employed to establish within which of the pairs of isophase lines spaced 289 feet apart and indicated by the phase meter 30 the mobile station 10 is positioned.

In order to obtain a position fix to provide absolute identification of the location of the mobile station 10, at least one additional fixed receiving station of the type shown in Fig. 1 is necessary. However, in order to simplify the illustration only a two foci system has been shown and described.

An alternative arrangement of the present invention is illustrated in Fig. 2 wherein there is shown an indicator unit 114 which, like the unit 14 previously described, provides coarse and fine position indications representative of the location of the mobile station 10 relative to a pair of fixed stations 111 and 112. The equipment illustrated in Fig. 2 is similar to that shown in Fig. 1, the essential difference being that the beat frequency signals developed at the fixed stations 111 and 112 are modulated upon suitable carrier waves for transmission to the indicator unit thereby avoiding the necessity for using relatively long and expensive transmission lines or cables interconnecting each of the fixed stations and the indicator unit. Specifically, the mobile station 10 illustrated in Fig. 2 is identical to the mobile station employed in the system shown in Fig. 1 and, accordingly, has been assigned the same reference numeral. Similarly, the fixed transmitting station or reference transmitter 13 of the system shown in Fig. 2 is identical to the station 13 shown in Fig. 1 and has been assigned the same reference numeral. The end station 111 includes a receiver 24 for heterodyning the 1700.000 kilocycle from the mobile station 10 and 1700.250 kilocycle signal from the fixed transmitting station 13 in order to develop a 250 cycle beat frequency signal for application to an amplitude modulator 120. Receiver 25 at the fixed station 111 heterodynes the 1750.000 kilocycle signal from the mobile station 10 and the 1750.600 kilocycle signal from the fixed transmitting station 13 in order to develop a 600 cycle beat frequency signal for application to the modulator 120. The modulator 120 amplitude modulates both of the beat frequency signals developed by receivers 24 and 25 upon the radio frequency carrier wave signals of 1850.000 kilocycles created by an oscillator 121 and applies the resulting modulated signal to a final amplifier 122 for emission from a radiating antenna 123 at the fixed end station 111.

Receiver 26 at the fixed station 112 heterodynes the 1700.000 kilocycle signal from the mobile station 10 and the 1700.250 kilocycle signal from the fixed transmitting station 13 to develop a 250 cycle beat frequency signal for application to an amplitude modulator 124. Receiver 27 heterodynes the 1750.000 kilocycle signal from the mobile station 10 and the 1750.600 kilocycle signal from the fixed transmitting station 13 in order to develop a 600 cycle beat frequency signal for application to the modulator 124. The modulator 124 functions to amplitude modulate the radio frequency signals of 1800.000 kilocycles created by an oscillator 125 with both of the audio frequency signals respectively developed by receivers 26 and 27. The output of the modulator 124, comprising a radio frequency signal simultaneously modulated with two audio frequency signals, is applied through a final amplifier 126 to a radiating antenna 127. The receivers 24 and 26 at the fixed stations 111 and 112, respectively, are sufficiently selective to reject all of the carrier waves radiated from the stations 10, 13, 111 and 112 except the two carrier waves heterodyned to produce the 250 cycle beat frequency signal. Similarly, the receivers 25 and 27 are sufficiently selective to reject all of the radiated signals except the two carrier waves which they heterodyne to produce the 600 cycle beat frequency signal.

Summarizing the operation of the above described system, it will be apparent that the mobile station 10 is effective continuously and simultaneously to radiate two radio frequency signals, the fixed transmitting station 13 is effective simultaneously and continuously to radiate two radio frequency signals and the fixed stations 111 and 112 are continuously effective to radiate carrier waves of different frequencies which are simultaneously modulated by a pair of audio frequency signals.

At the indicator unit 114, receiver 129 accepts the carrier wave radiated from the fixed station 111 and rejects all of the other radiated signals while the receiver 128, which is center tuned to a frequency of 1800.000 kilocycles accepts the carrier wave radiated from the fixed station 112 and rejects all of the remaining radiated signals. The 250 and 600 cycle modulation signals appearing upon the wave radiated from the fixed station 111 are reproduced by the receiver 129 and applied to the signal input terminals of a pair of band pass filters 135 and 136 in order to separate the reproduced signals. To this end, filter 135 rejects the 600 cycle signal but passes the 250 cycle signal to one of the sets of signal input terminals of a fine phase meter 130 and to one of the sets of signal input terminals of a mixer 131. Filter 136 rejects the 250 cycle signal but passes the 600 cycle signal to the second set of signal input terminals of the mixer 131. The latter mixer heterodynes or beats the two signals applied to its separate sets of input terminals and develops a 350 cycle signal which is applied to one of the sets of signal input terminals of a coarse phase meter 132. In similar manner, the two modulation signals carried upon the wave radiated from the fixed station 112 are reproduced by the receiver 128 and are applied to band pass filters 137 and 138 in order to separate these signals. Thus, band pass filter 137 rejects the 600 cycle signal and passes the 250 cycle signal to the second set of signal input terminals of the fine phase meter 130 and to one of the sets of signal input terminals of a mixer 133. Band pass filter 138 rejects the 250 cycle signal and passes the reproduced 600 cycle signal to the second set of signal input terminals of the mixer 133. The phase meter 130 measures the phase relationship between the two 250 cycle signals applied to its opposed sets of input terminals and provides a fine or high sensitivity position indication representative of the location of the mobile station 10 relative to the two fixed stations 111 and 112. The mixer 133 heterodynes the two signals applied to its sets of input terminals and develops a 350 cycle signal for application to the second set of input terminals of the coarse phase meter 132. The phase meter 132 measures the phase relationship between the two 350 cycle signals impressed across its opposite set of input terminals and provide a coarse or low sensitivity position indication representative of the location of the mobile station 10 relative to hyperbolic isophase lines spaced relatively far apart and having foci at the fixed stations 111 and 112. As previously indicated, if a position fix or absolute position determination of the location of the mobile station 10 is desired at least one additional fixed station similar to the stations 111 and 112 must be employed. In view of the foregoing description, it will be apparent that the phase meter 132 provides coarse position indications in order to determine the particular pair of isophase lines spaced relatively close together and indicated by the phase meter 130 between which the mobile station 10 is positioned.

Still another embodiment of the apparatus of the present invention is illustrated in Fig. 3 wherein there is provided an indicator unit 14 for providing position information relative to the location of the mobile station 10 with respect to a pair of spaced, fixedly positioned receiving stations 211 and 212. The apparatus illustrated in Fig. 3 is similar to that illustrated in Fig. 1 and differs therefrom primarily by the use of transmission lines or cables interconnecting the fixed signal generating station 213 and each of the fixed receiving stations 211 and 212. Specifically, in the apparatus illustrated in Fig. 3, the mobile transmitting station 10 is identical to the mobile station shown in Fig. 1 and, hence, has been assigned the same reference number. Similarly, the indicating unit 14 is identical to the indicating unit illustrated in Fig. 1 and has also been assigned the same reference number. The fixed signal generating station 213 comprises a pair of oscillators 215 and 216 respectively generating radio frequency signals having frequencies of 1700.250 kilocycles and 1750.600 kilocycles. Both of these generated signals are supplied to the fixed receiving station 211 through a transmission line or multi-conductor cable 217 and are also applied through transmission line 218 to the fixed receiving station 212. Receivers 24 and 26 respectively disposed at the fixed stations 211 and 212 are supplied with the output signal from the oscillator 215 which is heterodyned with the 1700.000 kilocycle signal received from the mobile station 10 in order to develop a 250 cycle beat frequency signal. Each of the receivers 25 and 27 at the fixed stations 211 and 212, respectively, is supplied with the signals developed by the oscillator 216. Thus, receivers 25 and 27 heterodyne the signals from oscillator 216 with the 1750.000 kilocycle signals received from the mobile station 10 in order to develop 600 cycle beat frequency signals. The 250 and 600 cycle beat frequency signals developed at each of the fixed receiving stations 211 and 212 are applied through multi-conductor cables 28 and 29 to the indicator unit 14 where these signals provide fine and coarse position indications respectively appearing upon the phase meters 30 and 32 in the manner previously described. Thus, the low phase sensitivity indications appearing upon the phase meter 32, which identify the position of the mobile station 10 relative to widely spaced isophase lines having foci at the fixed receiving stations 211 and 212, resolve the ambiguity of the fine position indications provided by the phase meter 30 which are indicative of the location of the mobile station 10 relative to closely spaced isophase lines having foci at the fixed stations 211 and 212. As previously indicated, a third fixed receiving station like the stations 211 and 212 may be provided to provide a three-foci system for establishing a position fix indicative of the location of the mobile station 10.

It will also be apparent that, if desired, the system shown in Fig. 3 may be modified by providing for the radiation of carrier waves from the fixed stations 211 and 212 in order to supply the developed beat frequency signals to the indicator unit as shown in Fig. 2.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a radio position finding system of the hyperbolic continuous wave type for locating the position of a mobile station, the combination of means at said mobile station for radiating first and second signals having different frequencies, fixedly positioned means for generating third and fourth signals having still different frequencies, and means jointly responsive to all four of said signals for providing coarse and fine position indications representative of the location of said mobile station.

2. In a radio position finding system of the hyperbolic continuous wave type for locating the position of a mobile station, the combination of means at said mobile station for radiating first and second signals having different frequencies, fixedly positioned means for generating third and fourth signals having still different frequencies, means jointly responsive to the first and third of said signals for providing a fine position indication representative of the location of said mobile station, and means jointly responsive to all four of said signals for providing a coarse position indication representative of the location of said mobile station in order to resolve the ambiguity of the fine position indications.

3. In a radio position finding system of the hyperbolic continuous wave type for locating the position of a mobile station relative to a pair of spaced fixed stations, the combination of means at said mobile station for radiating first and second signals having different frequencies, fixedly positioned means for generating third and fourth signals having still different frequencies, means at each of said fixed stations jointly responsive to all four of said signals for developing control signals, and means responsive to said control signals for providing coarse and fine position indications representative of the location of the mobile station relative to said fixed station.

4. In a radio position finding system of the hyperbolic continuous wave type for locating the position of a mobile station relative to a pair of fixed stations, the combination of means at said mobile station for radiating first and second signals having different frequencies, fixedly positioned means for generating third and fourth signals having still different frequencies, means at each of said fixed stations jointly responsive to said first and third signals for developing a first control signal, means at each of said fixed stations jointly responsive to said second and fourth signals for developing a second control signal, means responsive to the first control signal developed at each of the fixed stations for providing a fine position indication representative of a location of said mobile station relative to said two fixed stations, and means jointly responsive to the first and second control signals developed at each of said fixed stations for providing a coarse position indication representative of the location of said mobile station relative to said two fixed stations in order to resolve the ambiguity of the fine position indications.

5. In a radio position finding system of the hyperbolic continuous wave type for determining the position of a mobile station with respect to a pair of fixed stations, the combination of means at said mobile station for transmitting first and second signals of different frequencies, fixedly positioned means spaced from the mobile stations for generating third and fourth signals having still different frequencies, means at the first of said pair of fixed stations for respectively heterodyning said first and second waves with said third and fourth waves to produce first and second beat frequency signals, means at the second of said pair of fixed stations for respectively heterodyning said first and second waves with said third and fourth waves to produce third and fourth beat frequency signals, and means jointly responsive to all four of said beat frequency signals for providing coarse and fine position indications representative of the location of said mobile station relative to said pair of fixed stations.

6. In a radio position finding system of the hyperbolic continuous wave type for determining the position of a mobile station with respect to a pair of fixed stations, the combination of means at said mobile station transmitting first and second signals of different frequencies, fixedly positioned means spaced from the mobile station for generating third and fourth signals having still different frequencies, means at the first of said pair of fixed stations for respectively heterodyning said first and second signals with said third and fourth signals to produce first and second beat frequency signals, means at the second of said pair of fixed stations for respectively heterodyning said first and second signals with said third and fourth signals to produce third and fourth beat frequency signals, means for measuring the phase relationship between said first and third beat frequency signals to provide a fine position indication representative of the location of the mobile station with respect to said pair of fixed stations, and means jointly responsive to all four of said beat frequency signals for providing a coarse position indication representative of the location of said mobile station with respect to said pair of fixed stations in order to resolve the ambiguity of the fine position indications.

7. In a radio position finding system of the hyperbolic continuous wave type for determining the position of a mobile station with respect to a pair of fixed stations, the combination of means at said mobile station for transmitting first and second signals of different frequencies, fixedly positioned means spaced from the mobile station for generating third and fourth signals having still different frequencies, means at the first of said pair of fixed stations for respectively heterodyning said first and second signals with said third and fourth signals to produce first and second beat frequency signals, means at the second of said pair of fixed stations for respectively heterodyning said first and second signals with said third and fourth signal to produce third and fourth beat frequency signals, means for measuring the phase relationship between said first and third beat frequency signals to provide a fine position indication representative of the location of the mobile station with respect to said pair of fixed stations, means for heterodyning said first and second beat frequency signals to provide a first control signal, means for heterodyning said third and fourth beat frequency signals to provide a second control signal, and means for measuring the phase relationship between said first and second control signals in order to provide a coarse position indication representative of the location of said mobile station relative to said pair of fixed stations, thereby to resolve the ambiguity of the fine position indications.

8. In a radio position finding system of the hyperbolic continuous wave type for determining the location of a mobile station relative to a pair of fixed stations, the combination of a fixedly positioned signal generating unit, a first pair of signal generating means for developing a first pair of signals, a second pair of signal generating means for developing a second pair of signals, one of the signal generating means of each pair being disposed at the mobile station and the other signal generating means of each pair being located at the signal generating unit, receiving means at each of said fixed stations responsive to the first pair of signals for creating a first control signal, receiving means at each of the fixed stations responsive to the second pair of signals for creating a second control signal, and means jointly responsive to both of the control signals created at each of the fixed stations for providing fine and coarse position indications representative of the location of said mobile station relative to said pair of fixed stations.

9. In a radio position finding system of the hyperbolic continuous wave type for determining the location of the mobile station relative to a pair of fixed stations, the combination of a fixedly positioned generating unit, a first pair of signal generating means for developing a first pair of signals, a second pair of signal generating means for developing a second pair of signals, one of the signal generating means of each pair being located at the mobile station and the other signal generating means of each pair being disposed at the signal generating unit, receiving means at each of said fixed stations responsive to the first pair of signals for creating a first control signal, receiving means at each of the fixed stations responsive to the second pair of signals for creating a second control signal, means jointly responsive to the first control signal created at each of said receiving stations for providing a fine position indication representative of the location of said mobile station relative to said pair of fixed stations, and means jointly responsive to both of the control signals developed at each of said receiving stations for providing a coarse position indication representative of the location of said mobile station relative to said pair of fixed stations in order to resolve the ambiguity of the fine position indications.

10. In a radio position finding system of the hyperbolic continuous wave type for determining the location of a mobile station relative to a pair of fixed stations, the combination of a fixedly positioned signal generating unit, a first pair of signal generating means for developing a first pair of signals, a second pair of signal generating means for developing a second pair of signals, one of the signal generating means of each pair being located at the mobile station and the other signal generating means being located at the signal generating unit, receiving means at each of the fixed receiving stations for heterodyning the first pair of signals in order to develop a first beat frequency signal, receiving means at each of the fixed receiving stations for heterodyning the second pair of signals in order to develop a second beat frequency signal, and means jointly responsive to both of the beat frequency signals developed by the receiving means at each of the fixed stations for providing coarse and fine position indications representative of the location of said mobile station relative to said pair of fixed stations.

11. In a radio position finding system of the hyperbolic continuous wave type for determining the location of a mobile station relative to a pair of fixed stations, the combination of a fixedly positioned signal generating unit, a first pair of signal generating means for developing a first pair of signals, a second pair of signal generating means for generating a second pair of signals, one of the signal generating means of each pair being disposed at the mobile station and the other signal generating means of each pair being disposed at the signal generating unit, receiving means at each of the fixed stations for heterodyning the first pair of signals to develop a first beat frequency signal, receiving means at each of the fixed stations for heterodyning the second pair of signals to develop a second beat frequency signal, means for measuring the phase relationship between the first beat frequency signal developed at each of said fixed stations in order to provide a fine position indication representative of the location of said mobile station relative to said pair of fixed stations, and means jointly responsive to both of the beat frequency signals developed at each of said fixed stations for providing a coarse position indication representative of the location of said mobile station relative to said pair of fixed receiving stations in order to resolve the ambiguity of the fine position indications.

12. In a radio position finding system of the hyperbolic continuous wave type for determining the location of a mobile station relative to a pair of fixed stations, the combination of a fixedly positioned signal generating unit, a first pair of signal generating means for developing a first pair of signals, a second pair of signal generating means for developing a second pair of signals, one of the signal generating means of each pair being disposed at the mobile station and the other signal generating means of each pair being disposed at the signal generating unit, receiving means at each of the fixed stations for heterodyning the first pair of signals to develop a first beat frequency signal, receiving means at each of the fixed stations for heterodyning the second pair of signals to develop a second beat frequency signal, means for measuring the phase relationship between the first beat frequency signal developed at each of the fixed stations in order to provide a fine position indication representative of the location of the mobile station relative to said pair of fixed stations, means for heterodyning the first and second beat frequency signals developed at a first of said fixed stations in order to provide a first control signal, means for heterodyning the first and second beat frequency signals developed at the second of said fixed stations in order to provide a second control signal, and means for measuring the phase relationship between said first and second control signals in order to provide a coarse position indication representative of the location of said mobile station relative to said pair of fixed stations, thereby to resolve the ambiguity of the fine position indications.

13. In a radio position finding system of the hyperbolic continuous wave type for locating the position of a mobile station relative to a pair of spaced fixed stations, the combination of means at said mobile station for radiating first and second signals having different frequencies, fixedly positioned means for generating third and fourth signals having still different frequencies, means at each of said fixed stations jointly responsive to all four of said signals for developing control signals, an indicator unit spaced from said fixed stations and responsive to said control signals for providing coarse and fine position indications representative of the location of the mobile station relative to said fixed station, and means for transferring said control signals from said fixed stations to said indicator unit.

14. The apparatus defined by claim 13 wherein the means for transferring control signals from the fixed stations to the indicator unit comprises a transmission line, 15. The apparatus defined by claim 13 wherein the means for transferring control signals from the fixed stations to the indicator unit comprises a source of carrier waves at each of said fixed stations, means for modulating the control signals developed at each fixed station upon the carrier waves from the source at that station, and means at the indicator unit for receiving the carrier waves from both of the fixed stations and for reproducing the modulated control signals.

16. In a radio position finding system of the hyperbolic continuous wave type for locating the position of a mobile station relative to a pair of fixed stations, the combination of means at said mobile station for radiating first and second signals having different frequencies; fixedly positioned means for generating third and fourth signals having still different frequencies; means at each of said fixed stations jointly responsive to said first and third signals for developing a first control signal; means at each of said fixed stations jointly responsive to said second and fourth signals for developing a second control signal; an indicator unit spaced from said fixed stations and including means responsive to the first control signal developed at each of the fixed stations for providing a fine position indication representative of a location of said mobile station relative to said two fixed stations, and means jointly responsive to the first and second control signals developed at each of said fixed stations for providing a coarse position indication representative of the location of said mobile station relative to said two fixed stations in order to resolve the ambiguity of the fine position indications; and means for transferring the control signals from each of the fixed stations to said indicator unit.

17. The apparatus defined by claim 16 wherein the means for transferring control signals from the fixed stations to the indicator unit comprises a transmission line.

18. The apparatus defined by claim 16 wherein the means for transferring control signals from the fixed stations to the indicator unit comprises a source of carrier waves at each of said fixed stations, means for modulating the control signals developed at each fixed station upon the carrier waves from the source at that station, and means at the indicator unit for receiving the carrier waves from both of the fixed stations and for reproducing the modulated control signals.

19. In a radio position finding system of the hyperbolic continuous wave type for determining the position of a mobile station with respect to a pair of fixed stations, the combination of means at said mobile station for transmitting first and second signals of different frequencies, fixedly positioned means spaced from the mobile stations for generating third and fourth signals having still different frequencies, means at the first of said pair of fixed stations for respectively heterodyning said first and second waves with said third and fourth waves to produce first and second beat frequency signals, means at the second of said pair of fixed stations for respectively heterodyning said first and second waves with said third and fourth waves to produce third and fourth beat frequency signals, an indicator unit spaced from said fixed stations jointly responsive to all four of said beat frequency signals for providing coarse and fine position indications representative of the location of said mobile station relative to said pair of fixed stations, and means for transferring the beat frequency signals from said fixed stations to said indicator unit.

20. In a radio position finding system of the hyperbolic continuous wave type for determining the position of a mobile station with respect to a pair of fixed stations; the combination of means at said mobile station transmitting first and second signals of different frequencies; fixedly positioned means spaced from the mobile station for generating third and fourth signals having still different frequencies; means at the first of said pair of fixed stations for respectively heterodyning said first and second signals with said third and fourth signals to produce first and second beat frequency signals; means at the second of said pair of fixed stations for respectively heterodyning said first and second signals with said third and fourth signals to produce third and fourth beat frequency signals; an indicator unit spaced from said fixed stations and including means for measuring the phase relationship between said first and third beat frequency signals to provide a fine position indication representative of the location of the mobile station with respect to said pair of fixed stations, and means jointly responsive to all four of said beat frequency signals for providing a coarse position indication representative of the location of said mobile station with respect to said pair of fixed stations in order to resolve the ambiguity of the fine position indications; and means for transferring all of the beat frequency signals from said fixed stations to said indicator unit.

References Cited in the file of this patent

UNITED STATES PATENTS

| | | |
|---|---|---|
| 2,527,548 | Hastings | Oct. 31, 1950 |
| 2,528,141 | Hastings | Oct. 31, 1950 |
| 2,652,558 | Hawkins | Sept. 15, 1953 |
| 2,730,714 | Mahoney | Jan. 10, 1956 |